(12) United States Patent
Tatehata et al.

(10) Patent No.: US 11,531,101 B2
(45) Date of Patent: Dec. 20, 2022

(54) SENSOR UNIT, SENSOR SYSTEM, AND FUNCTION ACTIVATION METHOD

(71) Applicant: OMRON Corporation, Kyoto (JP)

(72) Inventors: Kazuki Tatehata, Ayabe (JP); Yusuke Shibasaki, Kyoto (JP); Kiyohiko Gondo, Kameoka (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 17/415,736

(22) PCT Filed: Dec. 25, 2019

(86) PCT No.: PCT/JP2019/050728
§ 371 (c)(1),
(2) Date: Jun. 18, 2021

(87) PCT Pub. No.: WO2020/158267
PCT Pub. Date: Aug. 6, 2020

(65) Prior Publication Data
US 2022/0066028 A1 Mar. 3, 2022

(30) Foreign Application Priority Data

Jan. 30, 2019 (JP) .............................. JP2019-014628

(51) Int. Cl.
*G01S 17/04* (2020.01)
*H04B 10/40* (2013.01)

(52) U.S. Cl.
CPC .............. *G01S 17/04* (2020.01); *H04B 10/40* (2013.01)

(58) Field of Classification Search
CPC ............................... H04B 10/40; G01S 17/04

USPC ........................................................ 398/135
See application file for complete search history.

(56) References Cited

U.S. PATENT DOCUMENTS

| 3,670,248 A | 6/1972 | Hofmann |
| 2008/0048825 A1 | 2/2008 | Naether |
| 2010/0185418 A1* | 7/2010 | Fukumura ......... H04L 12/40013 702/188 |
| 2011/0018688 A1* | 1/2011 | Hanada ............. H04L 12/40013 340/10.1 |

(Continued)

FOREIGN PATENT DOCUMENTS

| CN | 103808343 | 5/2014 |
| EP | 1557648 | 7/2005 |
| JP | 2001222786 | 8/2001 |

(Continued)

OTHER PUBLICATIONS

Xiang-Ping Lin, "Electronic Countermeasures Principles Part 2," National Defense Industry Press, Jan. 1982, pp. 1-1.

(Continued)

*Primary Examiner* — Dalzid E Singh
(74) *Attorney, Agent, or Firm* — JCIPRNET

(57) ABSTRACT

Provided are a sensor unit and function activation method that make it possible to collectively activate the functions of a plurality of sensor units. A sensor unit 10, which can be connected to other sensor units 10 to form a unit series, comprises an activation unit 64 for activating a prescribed function on the basis of a signal from the outside and a signal output unit 65 for outputting a trigger signal for activating a prescribed function to the outside on the basis of a signal from the outside.

14 Claims, 11 Drawing Sheets

(56) References Cited

U.S. PATENT DOCUMENTS

2019/0097629 A1* 3/2019 Yamazaki ............... G01D 7/00

FOREIGN PATENT DOCUMENTS

| JP | 2003227880 | 8/2003 |
|---|---|---|
| JP | 2003337988 | 11/2003 |
| JP | 2014096697 | 5/2014 |

OTHER PUBLICATIONS

"Office Action of China Counterpart Application" with English translation thereof, dated Apr. 14, 2022, p. 1-p. 17.
"International Search Report (Form PCT/ISA/210) of PCT/JP2019/050728," dated Mar. 17, 2020, with English translation thereof, pp. 1-4.
"Written Opinion of the International Searching Authority (Form PCT/ISA/237) of PCT/JP2019/050728," dated Mar. 17, 2020, with English translation thereof, pp. 1-9.
"Search Report of Europe Counterpart Application", dated Sep. 19, 2022, p. 1-p. 7.
Liu, Jun et al., "STM32F7 Principles and Applications Under the Register Edition," Beijing University of Aeronautics and Astronautics Press, Jun. 2017, pp. 20-29.
"Decision of Rejection of China Counterpart Application" with English translation thereof, dated Sep. 30, 2022, p. 1-p. 18.

* cited by examiner

| # | Meaning | Content |
|---|---|---|
| byte: 0 | Identification header | 0xff |
| byte: 1 | Self CH Number | 0x01 |
| byte: 2 | Number of sensor type A | 0x01 |
| byte: 3 | Number of sensor type B | 0x00 |
| byte: 4 | Number of sensor type C | 0x00 |
| byte: 5 | Number of sensor type D | 0x00 |
| byte: 6 | Number of sensor type E | 0x00 |
| byte: 7 | Number of sensor type F | 0x00 |
| byte: 8 | Number of sensor type G | 0x00 |
| byte: 9 | Number of sensor type H | 0x00 |

FIG. 5

| # | Meaning | Content |
|---|---|---|
| byte: 0 | Identification header | 0xff |
| byte: 1 | Self CH Number | 0x02 |
| byte: 2 | Number of sensor type A | 0x02 |
| byte: 3 | Number of sensor type B | 0x00 |
| byte: 4 | Number of sensor type C | 0x00 |
| byte: 5 | Number of sensor type D | 0x00 |
| byte: 6 | Number of sensor type E | 0x00 |
| byte: 7 | Number of sensor type F | 0x00 |
| byte: 8 | Number of sensor type G | 0x00 |
| byte: 9 | Number of sensor type H | 0x00 |

FIG. 6

| Pulse width [us] | Period [ms] | Purpose |
|---|---|---|
| Wd1 or more | Pe1 | Synchronization of measurement timing |
| Wd2 or more | Pe2 | Measurement timing synchronization, measurement value output timing, mutual interference prevention timing (A, B) |
| Wd3 or more | Pe3 | Measurement timing synchronization, measurement value output timing, mutual interference prevention timing (C, D) |
| Wd4 | Pe3 | Measurement timing synchronization, measurement value output timing, mutual interference prevention timing, sensitivity adjustment |
| Wd5 | Pe3 | Measurement timing synchronization, measurement value output timing, mutual interference prevention timing, switching to first setting |
| Wd6 | Pe3 | Measurement timing synchronization, measurement value output timing, mutual interference prevention timing, switching to second setting |

FIG. 8

SENSOR UNIT, SENSOR SYSTEM, AND FUNCTION ACTIVATION METHOD

CROSS-REFERENCE TO RELATED APPLICATION

This application is a 371 application of the International PCT application serial no. PCT/JP2019/050728, filed on Dec. 25, 2019, which claims the priority benefits of Japan Patent Application No. 2019-014628, filed on Jan. 30, 2019. The entirety of each of the above-mentioned patent applications is hereby incorporated by reference herein and made a part of this specification.

BACKGROUND OF THE INVENTION

Field of the Invention

The invention relates to a sensor unit and a function activation method.

Description of Related Art

Conventionally, as a sensor system, a sensor system having multiple sensor units combined to be able to transmit signals via a connector means is known. The sensor units respectively hold identification information, and set respective inherent identification numbers through signal transmission with one another. The respective sensor units operate after a delay time determined in correspondence with the respective identification numbers by using a synchronization signal transmitted at a prescribed period from a sensor unit having a specific type number among the sensor units as a start point. The delay time of each of the sensor units is determined so that an operation period is consistent with a prescribed period determined for each type information and different from the delay times of other sensor units having the same type information (see Patent Document 1). In the sensor system, the operation period arbitrarily determined for each type is realized, and interference among those of the same type is avoided.

PRIOR ART DOCUMENT

Patent Document

[Patent Document 1] Japanese Laid-open No. 2014-96697

SUMMARY OF THE INVENTION

Problems to be Solved by the Invention

Here, in a sensor system having multiple photoelectric sensor units, there is a need for collectively making sensitivity adjustment to the light receiving sensitivity or changing a threshold with respect to the photoelectric sensor units. In such case, the conventional sensor system adopts a configuration in which each sensor unit has a communication function, and the sensor system is provided with a communication unit capable of transmitting a command of sensitivity adjustment or threshold setting with respect to the respective sensor units.

However, in the case where the communication unit is not provided as in the sensor system disclosed in Patent Document 1, there is no way to collectively activate a function with respect to the sensor units. Therefore, it is necessary to perform an operation to activate the function for each of all the sensor units, and the work load becomes a burden.

Therefore, an objective of the invention is to provide a sensor unit and a function activation method capable of collectively activating a function with respect to multiple sensor units.

Means for Solving Problems

A sensor unit according to an aspect of the invention is capable of forming a unit series by connecting multiple sensor units and includes: an activation unit, activating a prescribed function based on a signal from outside; and a signal output unit, outputting a trigger signal for activating the prescribed function to the outside based on the signal from the outside.

According to the aspect, the prescribed function, such as the sensitivity adjustment function, is activated based on the signal from the outside, and the trigger signal for activating the prescribed function is output to the outside based on the signal from the outside. Accordingly, the trigger signal can be transmitted to the adjacent sensor unit in the unit series, such as the sensor unit adjacent on the right. Accordingly, with the respective sensor units successively transmitting the trigger signal, the prescribed function, such as the sensitivity adjustment function, with respect to the sensor units can be collectively activated, and the work load for activating the prescribed function, such as the sensitivity adjustment function, in each sensor unit can be reduced.

According to the aspect, the sensor unit may further include a light communication unit capable of light signal transmission and reception. The signal output unit may transmit a light signal including the trigger signal to one of the sensor units in the unit series by using the light communication unit.

According to the aspect, the light signal including the trigger signal is transmitted to one of the sensor units in the unit series, such as the sensor unit adjacent on the right. Accordingly, a light signal used for another purpose, such as a synchronization signal, can be used to transmit the trigger signal.

According to the aspect, at a time of a slave unit in the unit series, the activation unit may activate the prescribed function based on the trigger signal included in the light signal received from another sensor unit in the unit series by using the light communication unit.

According to the aspect, at the time of the slave unit in the unit series, a light signal is received from the other side in the unit series, such as from the sensor unit adjacent on the left, and the prescribed function is activated based on the trigger signal included in the received light signal. Accordingly, the light signal used for another purpose, such as a synchronization signal, can be used, and, in the case of the slave unit in the unit series, the prescribed function can be easily activated.

According to the aspect, the trigger signal may be represented as a pulse wave. At a time of a slave unit in the unit series, the activation unit may activate the prescribed function based on the width of the pulse wave included in the light signal received from another sensor unit in the unit series by using the light communication unit.

According to the aspect, the prescribed function is activated based on the pulse width of the pulse wave included in the light signal. Accordingly, the trigger signal and signals other than the trigger signal in the light signal can be identified, and, in the light signal, the trigger signal and other signals, such as the synchronization signal can be easily used together.

According to the aspect, the trigger signal may be represented as a pulse wave. At a time of a slave unit in the unit series, the activation unit may activate the prescribed function based on the width of the pulse wave included in the light signal received from another sensor unit in the unit series by using the light communication unit and the number of the pulse wave included in the light signal during a prescribed period.

According to the aspect, the prescribed function is activated based on the pulse width of the pulse wave included in the light signal and the number of the pulse wave included in the light signal during the prescribed period. Accordingly, the trigger signal and signals other than the trigger signal in the light signal can be easily identified, and, in the light signal, the trigger signal and other signals, such as the synchronization signal can be even more easily used together.

According to the aspect, the trigger signal may be represented as a pulse wave, and the prescribed function may include multiple functions. At a time of a slave unit in the unit series, the activation unit may activate one of the functions based on a width of the pulse wave included in the light signal received from another sensor unit in the unit series by using the light communication unit.

According to the aspect, the prescribed function includes multiple functions, and one of the functions is activated based on the pulse width of the pulse wave included in the light signal. Accordingly, the functions included in the prescribed function can be easily chosen and activated.

According to the aspect, the sensor unit may further include an outside input unit receiving an outside input signal. At a time of a master unit in the unit series, the activation unit activates the prescribed function based on the outside input signal.

According to the aspect, at the time of the master unit in the unit series, the prescribed function is activated based on the outside input signal. Accordingly, by using the outside input signal, which is different from the case of the slave unit, the prescribed function can be easily activated in the case of the master unit in the unit series.

According to the aspect, the sensor unit may further include a light projection unit, emitting light toward a target object; and a light receiving unit, configured to receive light to be able to detect a light receiving amount.

According to the aspect, the sensor unit further includes a light projection unit, emitting light toward a target object; and a light receiving unit, configured to receive light to be able to detect a light receiving amount. Accordingly, a photoelectric sensor unit with which a prescribed function is collectively activated with respect to multiple photoelectric sensor units can be easily realized.

In addition, a sensor system according to another aspect of the invention includes multiple sensor units.

According to the aspect, multiple sensor units are included. Accordingly, the respective sensor units can collectively activate the prescribed function, and the work load for activating the prescribed function in each sensor unit can be reduced.

In addition, a function activation method according to still another aspect of the invention is capable of forming a unit series by connecting multiple sensor units. The function activation method includes: an activation step of activating a prescribed function based on a signal from outside; and a signal output step of outputting a trigger signal for activating the prescribed function to the outside based on the signal from the outside.

According to the aspect, the prescribed function, such as the sensitivity adjustment function, is activated based on the signal from the outside, and the trigger signal for activating the prescribed function is output to the outside based on the signal from the outside. Accordingly, the trigger signal can be transmitted to the adjacent sensor unit in the unit series, such as the sensor unit adjacent on the right. Accordingly, with the respective sensor units successively transmitting the trigger signal, the prescribed function, such as the sensitivity adjustment function, with respect to the sensor units can be collectively activated, and the work load for activating the prescribed function, such as the sensitivity adjustment function, in each sensor unit can be reduced.

According to the aspect, the signal output step may include transmitting a light signal including the trigger signal to one of the sensor units in the unit series.

According to the aspect, the light signal including the trigger signal is transmitted to one of the sensor units in the unit series, such as the sensor unit adjacent on the right. Accordingly, a light signal used for another purpose, such as a synchronization signal, can be used to transmit the trigger signal.

According to the aspect, the activation step may include: at a time of a slave unit in the unit series, activating the prescribed function based on the trigger signal included in the light signal received from another sensor unit in the unit series.

According to the aspect, at the time of the slave unit in the unit series, a light signal is received from the other side in the unit series, such as from the sensor unit adjacent on the left, and the prescribed function is activated based on the trigger signal included in the received light signal. Accordingly, the light signal used for another purpose, such as a synchronization signal, can be used, and, in the case of the slave unit in the unit series, the prescribed function can be easily activated.

According to the aspect, the trigger signal may be represented as a pulse wave. The activation step may include: at a time of a slave unit in the unit series, activating the prescribed function based on a width of the pulse wave included in the light signal received from another sensor unit in the unit series.

According to the aspect, the prescribed function is activated based on the pulse width of the pulse wave included in the light signal. Accordingly, the trigger signal and signals other than the trigger signal in the light signal can be identified, and, in the light signal, the trigger signal and other signals, such as the synchronization signal can be easily used together.

According to the aspect, the trigger signal may be represented as a pulse wave. The activation step may include: at a time of a slave unit in the unit series, activating the prescribed function based on a width of the pulse wave included in the light signal received from another sensor unit in the unit series and a number of the pulse wave included in the light signal during a prescribed period.

According to the aspect, the prescribed function is activated based on the pulse width of the pulse wave included in the light signal and the number of the pulse wave included in the light signal during the prescribed period. Accordingly, the trigger signal and signals other than the trigger signal in the light signal can be easily identified, and, in the light signal, the trigger signal and other signals, such as the synchronization signal can be even more easily used together.

According to the aspect, the trigger signal may be represented as a pulse wave, and the prescribed function may include multiple functions. The activation step may include: at a time of a slave unit in the unit series, activating one of the functions based on a width of the pulse wave included in the light signal received from another sensor unit in the unit series.

According to the aspect, the prescribed function includes multiple functions, and one of the functions is activated based on the pulse width of the pulse wave included in the light signal. Accordingly, the functions included in the prescribed function can be easily chosen and activated.

According to the aspect, the activation step may include: at a time of a master unit in the unit series, activating the prescribed function based on an outside input signal.

According to the aspect, at the time of the master unit in the unit series, the prescribed function is activated based on the outside input signal. Accordingly, by using the outside input signal, which is different from the case of the slave unit, the prescribed function can be easily activated in the case of the master unit in the unit series.

Inventive Effects

According to the invention, the functions of multiple sensor units can be activated collectively.

BRIEF DESCRIPTION OF THE DRAWINGS

FIG. 5 is a diagram exemplifying binary data which a sensor unit of a master unit transmits.

FIG. 6 is a diagram exemplifying binary data which a sensor unit as a slave unit transmits.

FIG. 8 is a table exemplifying a relationship between a pulse wave included in the light signal of the light communication unit shown in FIG. 3 and a use thereof.

DESCRIPTION OF THE EMBODIMENTS

The embodiments of the invention will be described in the following. In the descriptions of the following drawings, like or similar parts are represented by like or similar symbols. However, the drawings are merely schematic. Therefore, specific dimensions should be determined in light of the following explanation. In addition, it goes without saying that the drawings include parts having different dimensional relationships and ratios from each other. Furthermore, the technical scope of the invention should not be construed as limited to the embodiment.

Figure 1:
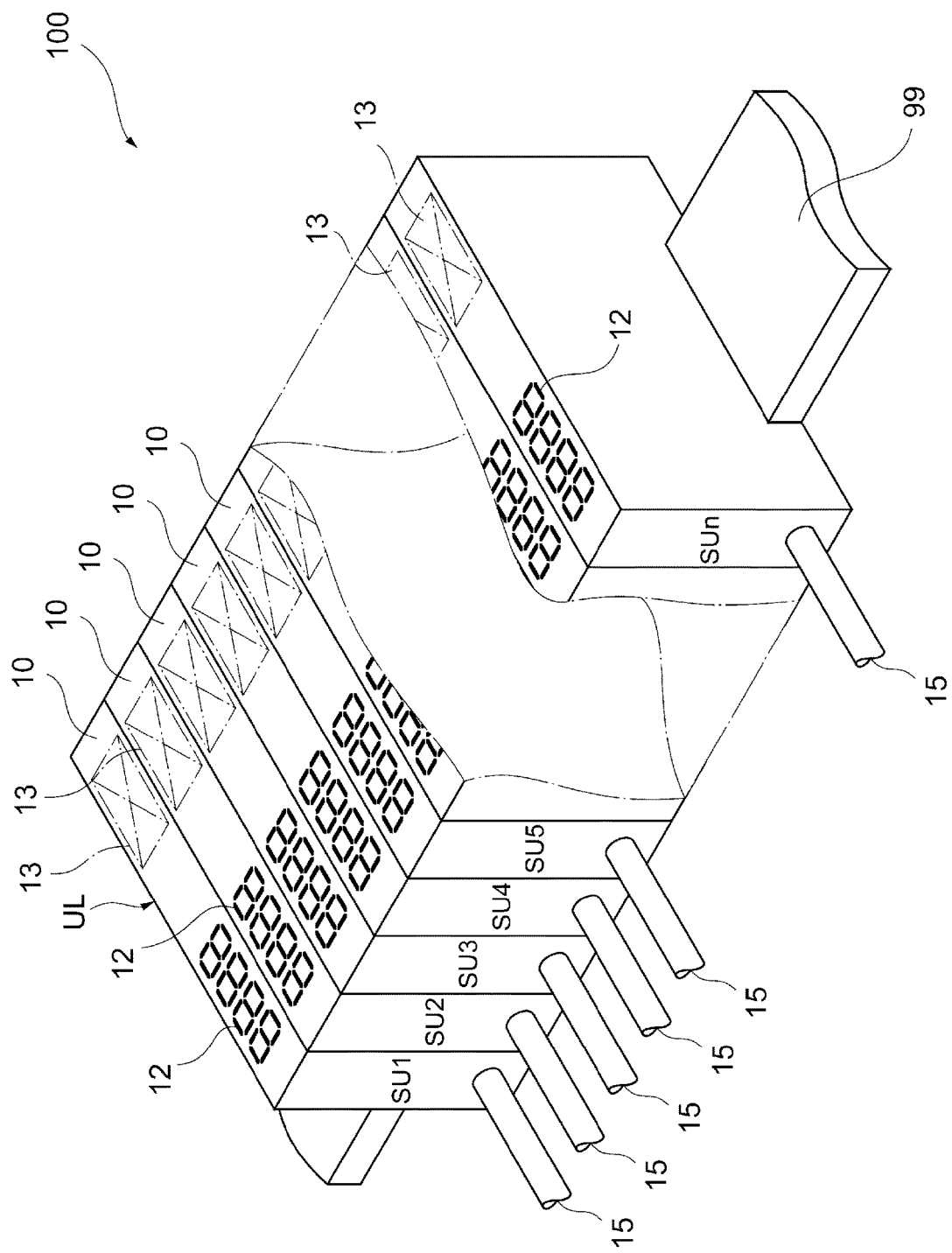
FIG. 1 is a diagram illustrating a schematic configuration of a sensor system according to an embodiment of the invention.
Figure 2:
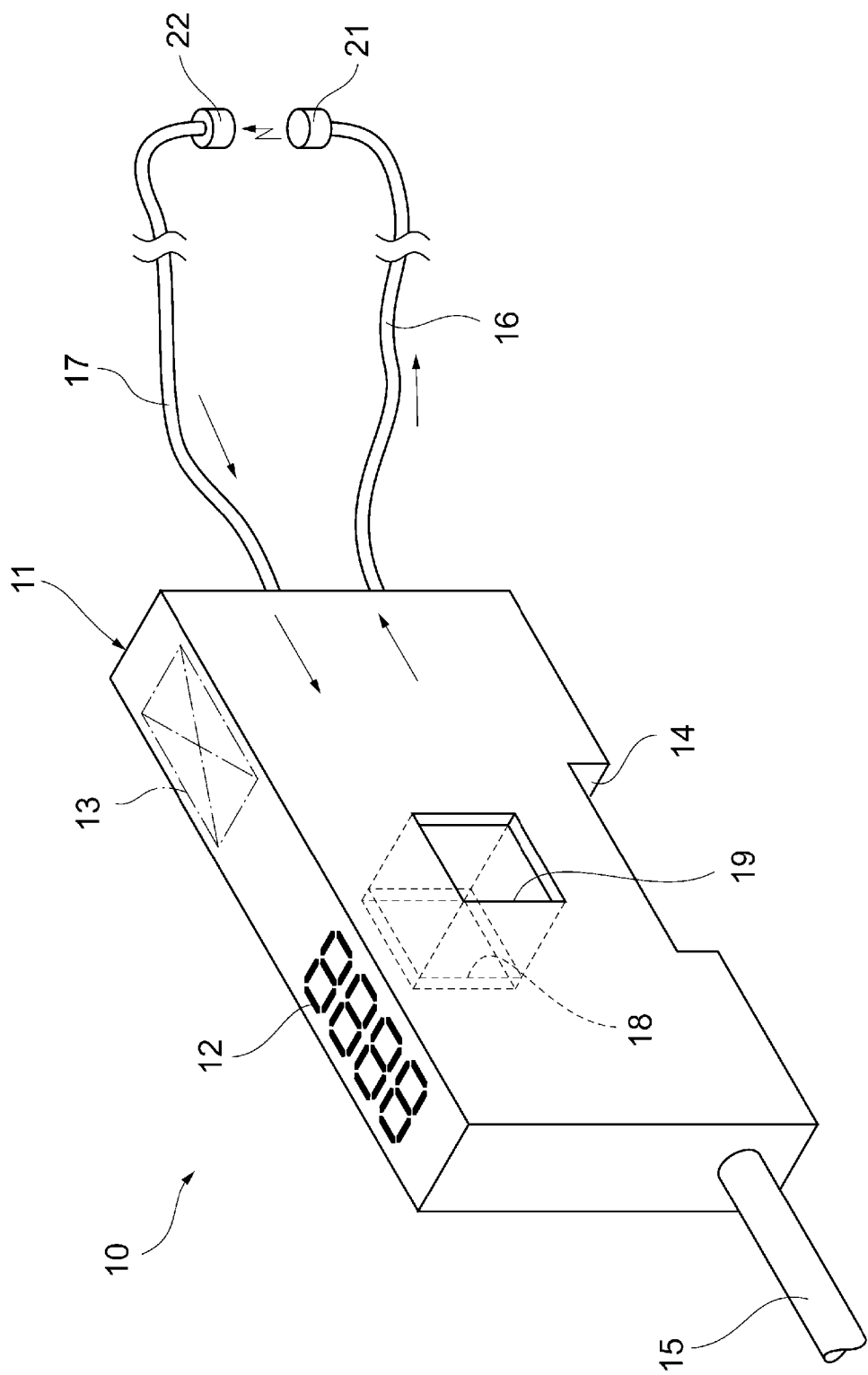
FIG. 2 is a perspective view exemplifying the appearance of a sensor unit shown in FIG. 1.

First of all, referring to FIGS. 1 and 2, an example of the appearance of a sensor unit according to an embodiment of the invention will be described. FIG. 1 is a diagram illustrating a schematic configuration of a sensor system 100 according to an embodiment of the invention. FIG. 2 is a perspective view exemplifying the appearance of a sensor unit 10 shown in FIG. 1.

As shown in FIG. 1, the sensor system 100 includes multiple sensor units 10. Each of the sensor units 10 is installed to a DIN rail 99, and the sensor units 10 are arranged to be adjacent to one another or provided with a fine gap therebetween. Therefore, the sensor units 10 form a sensor row UL configured by n (n being 2 or more) sensor units SU1 to SUn.

The sensor unit 10 is, for example, an optical fiber type photoelectric sensor unit. As shown in FIG. 2, the sensor unit 10 includes a housing 11 in a substantially rectangular parallelepiped shape. On the upper surface of the housing 11, a display unit 12 and an operation unit 13 are provided. The display unit 12 is configured as including a display with seven segments, for example. The operation unit 13 is configured as having multiple buttons, switches, etc., for example. On the lower surface of the housing 11, a groove 14 for attachment to the DIN rail 99 is formed.

An electric cord 15 is pulled out of the rear surface of the housing 11. The electric cord 15 is, for example, connected with a control machine such as a programmable logic controller (PLC), etc. In addition, from the front surface of the housing 11, an outbound optical fiber cable 16 and an inbound optical fiber cable 17 are pulled out. The tip of the outbound optical fiber 16 is connected with a sensor head 21, and the tip of the inbound optical fiber 17 is connected with the sensor head 22.

In addition, on the left side surface of the housing 11, a light communication window 18 is formed, and on the right side surface of the housing, which is a surface on the positive side of the X-axis in FIG. 2, a light communication window 19 is formed. In FIG. 2, the light communication windows 18 and 19 are shown as respectively having openings. However, the light communication windows 18 and 19 are actually covered by a filter member. The filter member is, for example, a filter that allows infrared light to pass through while cuts off visible light.

As shown in FIG. 1, when the sensor units 10 are arranged into a row to form the unit series UL, for example, the light communication window 19 of the sensor unit SU1 and the light communication window 18 of the sensor unit SU2 are opposite to each other. Accordingly, as will be described in the following, it is possible to communicate (occasionally referred to as light communication in the following) via light signals in two directions between the adjacent sensor units 10.

Figure 3:
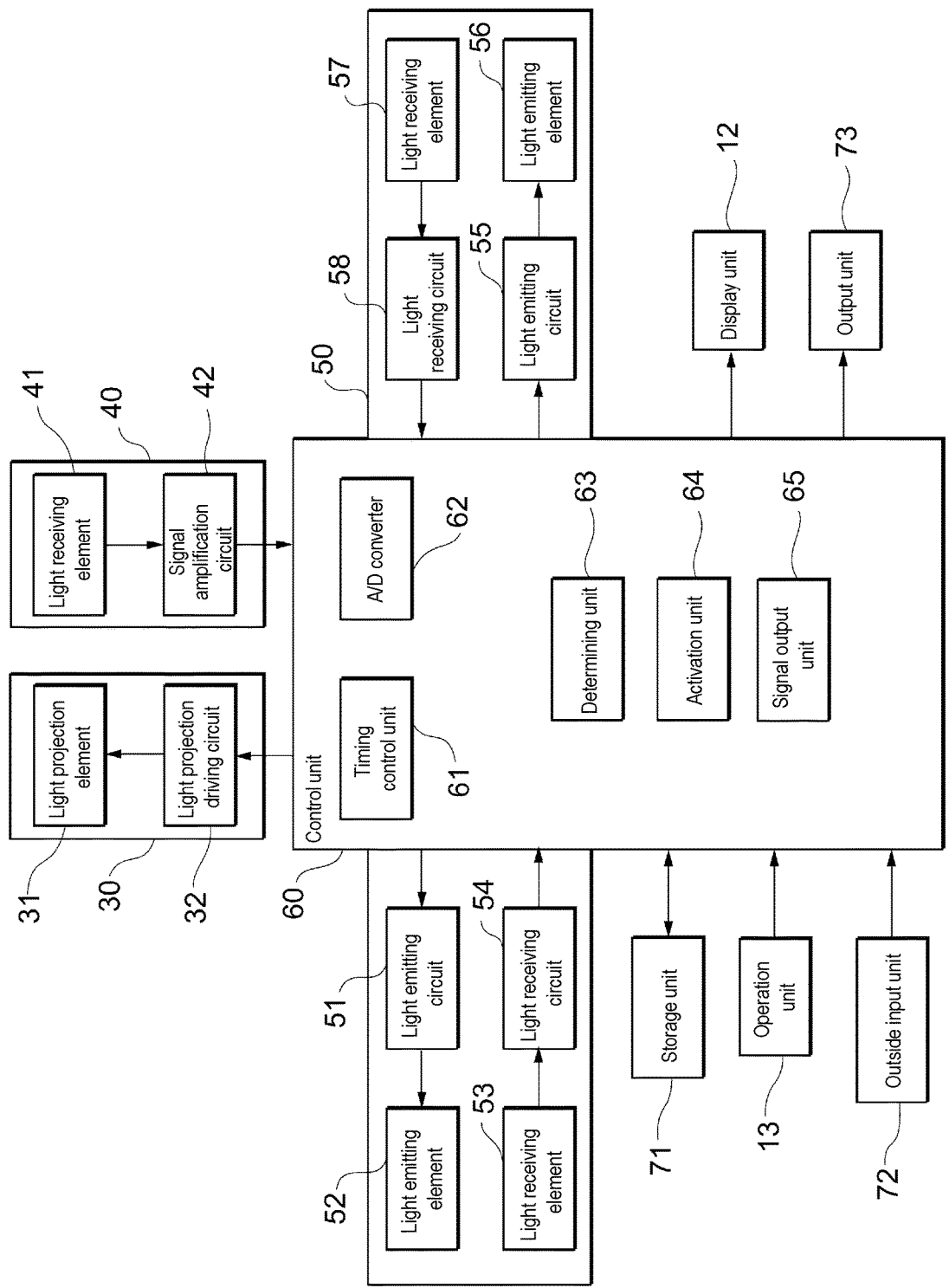
FIG. 3 is a block diagram exemplifying a schematic internal configuration of the sensor unit shown in FIG. 2.

Then, referring to FIG. 3, an example of the internal configuration of the sensor unit according to an embodiment of the invention is described. FIG. 3 is a block diagram exemplifying a schematic internal configuration of the sensor unit 10 shown in FIG. 2.

As shown in FIG. 3, in the sensor unit 10, a light projection unit 30, a light receiving unit 40, a light communication unit 50, a control unit 60, a storage unit 71, the operation unit 13, an outside input unit 72, the display unit 12, and an output unit 73 are provided.

The light projection unit 30 emits light toward a target object (not shown). The light projection unit 30, for example, includes a light projection element 31 and a light projection driving circuit 32. The light projection element 31 is a light emitting diode, for example. Alternatively, the light projection element 31 may also be a light emitting element such as a light emitting diode, a laser diode. The light projection driving circuit 32 drives the light projection element 31. Specifically, the light projection driving circuit 32 outputs a driving signal to the light projection element 31 based on a control signal input from the control unit 60. The light projection element 31 is driven by the driving signal to emit light.

The light receiving unit 40 is one in which multiple pixels respectively receive light to obtain light receiving distribution signals to be described afterwards. The light receiving unit 40, for example, includes a light receiving element 41 and a signal amplification circuit 42. The light receiving element 41 is a photodiode, for example. Alternatively, the light receiving element 41 may also be an image capturing element, such as a complementary MOSFET (CMOS) image sensor, a charge coupled device (CMD) image sensor, etc. An electrical signal obtained through light reception by the light receiving element 41 is amplified by the signal amplification circuit 42. The signal amplification circuit 42 outputs the amplified electrical signal to the control unit 60.

The light communication unit 50, as shown in FIG. 1, is configured between the adjacent sensor units 10 to enable light communication in two directions. The light communication unit 50 includes a light emitting circuit 51, a light emitting element 52, a light receiving element 53, and a light receiving circuit 54 for performing light communication with the sensor unit 10 adjacent on the left when viewed from itself and a light emitting circuit 55, a light emitting element 56, a light receiving element 57, and a light receiving circuit 58 for performing light communication with the sensor unit adjacent on the right when viewed from itself.

The light emitting element 52 and the light receiving element 53 are disposed inside the housing 11 so as to be opposite to the light communication window 18 shown in FIG. 2. The light emitting element 52 is, for example, a light emitting diode that emits infrared light, for example, and the light receiving element 53 is, for example, a photodiode. The control signal from the control unit 60 is input to the light receiving circuit 51. The light emitting circuit 51 makes the light emitting element 52 emit infrared light based on the control signal. The light receiving element 53 receives infrared light from the sensor unit 10 arranged to be adjacent on the left in FIG. 1, for example. An electrical signal (referred to as "light receiving signal") indicating a light receiving amount thereof is output to the control unit 60 via the light receiving circuit 54.

In addition, the light emitting element 56 and the light receiving element 57 are disposed inside the housing 11 so as to be opposite to the light communication window 19 shown in FIG. 2. The light emitting element 56 is, for example, a light emitting diode that emits infrared light, for example, and the light receiving element 57 is, for example, a photodiode. The control signal from the control unit 60 is input to the light receiving circuit 55. The light emitting circuit 55 makes the light emitting element 56 emit infrared light based on the control signal. The light receiving element 57 receives the infrared light from the sensor unit 10 arranged to be adjacent on the right in FIG. 1, for example. The light receiving signal indicating the light receiving amount thereof is output to the control unit 60 via the light receiving circuit 58.

The control unit 60 is configured to control the operations of the respective units of the sensor unit 10. In addition, the control unit 60 is configured to realize the respective functions to be described afterwards by executing a program stored in the storage unit 71, etc. The control unit 60 is configured as including a microprocessor, such as a central processing unit (CPU).

The control unit 60 includes a timing control unit 61 and an analog-to-digital (A/D) converter 62. The timing control unit 61 is configured so as to control the timing of the light emitted from the light projection unit 30 based on a synchronization signal included in the light receiving signal. Specifically, the timing control unit 61 outputs the control signal to the light projection driving circuit 32 at a prescribed timing by using the synchronization signal as a start point. The A/D converter 62 samples, quantizes, and encodes the electrical signal input from the signal amplification circuit 42 of the light receiving unit 40 to convert the electrical signal into a digital signal. The control unit 60 is configured so as to determine whether there is a target object by comparing the digital signal with a prescribed threshold. In addition, the control unit 60 is configured so as to generate a binary signal, in which "1" stands for the case where there is a target object and "0" stands for the case where there is no target object, according to the determination result, and output the binary signal to the outside via the output unit 73.

In addition, the control unit 60, as a functional configuration thereof, includes a determining unit 63, and activation unit 64, and a signal output unit 65, for example.

The determining unit 63 is configured so as to determine whether the sensor unit 10 of its own is a master unit (referred to as "master") or a slave unit (referred to as "slave") in the unit series UL. The determining unit 63 determines whether the sensor unit 10 is a master unit or a slave unit by recognizing the channel number by using the light communication unit 50, for example.

The activation unit 64 is configured so as to activate a prescribed function based on a signal from the outside. The signal from the outside is, for example, a light signal received by using the light communication unit 50, an outside input signal received by using an outside input unit 72 to be described afterwards, etc. In addition, the prescribed function is, for example, a sensitivity adjustment function for adjusting the sensitivity of the light receiving signal of the light receiving unit 40 for detecting the target object, a setting function for setting a setting value of various settings of the sensor unit 10. The prescribed function is not limited to one, but may also be multiple. In the case where there are multiple prescribed functions, a signal from the outside for activating one of the functions may be different from a signal from the outside for activating another function. The activation unit 64 may also generate and output a control signal, for example, to activate the prescribed function.

The signal output unit 65 is configured so as to output a trigger signal for activating the prescribed function to the outside based on the signal from the outside. The trigger signal is, for example, represented by a pulse wave having a prescribed amplitude (referred to as "pulse width" in the following). The type of the pulse wave is not particularly limited, and the pulse wave may be, for example, a sine wave, a square wave, a triangular wave, a sawtooth wave, etc. In addition, the pulse wave may be transmitted at a prescribed period.

More specifically, the signal output unit 65 is configured so as to transmit a light signal including the trigger signal to one of the sensor units 10 in the unit series UL, such as the sensor unit 10 adjacent on the right, by using the light communication unit 50. Accordingly, a light signal used for another purpose, such as a synchronization signal, can be used to transmit the trigger signal.

The activation unit 64 is configured to be different in the case of the master unit and the case of the slave unit in the unit series UL. Specifically, at the time of the slave unit in the unit series UL, the activation unit 64 receives a light signal from the other side in the unit series UL, such as from the sensor unit 10 adjacent on the left, by using the light communication unit 50, and activates the prescribed function based on the trigger signal included in the received light signal. Accordingly, a light signal used for another purpose, such as a synchronization signal, can be used, and, in the case of the slave unit in the unit series UL, the prescribed function can be easily activated.

Meanwhile, at the time of the master unit in the unit series UL, the activation unit 64 activates the prescribed function based on the outside input signal received by the outside input unit 72 to be described in the following. Accordingly, by using the outside input signal, which is different from the case of the slave unit, the prescribed function can be easily activated in the case of the master unit in the unit series UL.

The storage unit 71 is configured to store a program, data, etc. Specifically, the storage unit 71 stores a program executed by the control unit 60 and data such as a set value, etc. The storage unit 71 is configured to include a memory such as a read only memory (ROM), a random access memory (RAM), a buffer memory etc.

The external input unit 72 is configured so as to receive the outside input signal from the outside of the sensor unit 110. The outside input signal is an electrical signal, for example. The type of the outside input signal which the outside input unit 72 is able to receive is not limited to one type, but may include multiple types. The outside input unit 72 outputs the received outside input signal to the control unit 60.

The output unit 73 is a unit for outputting a signal to the outside of the sensor unit 10. The signal output by the output unit 73 is, for example, an electrical signal. The type of the signal output by the output unit 73 is not limited to one, but may include multiple types. The output unit 73 outputs a signal based on the control signal input from the control unit 60.

The operation unit 13 is a unit for inputting information to the sensor unit 10. For example, when a user operates a button, a switch, etc., of the operation unit 13, the control unit 60 generates data in correspondence with the operation. Accordingly, information is input to the sensor unit 10.

The display unit 12 is a unit for outputting information of the sensor unit 10. The display unit 12, for example, displays the determination result on whether there is a target object by using a numeral, text, a symbol, etc. In addition, the display unit 12 displays contents set/to be set in the sensor unit 10, such as a value, an ON/OFF state, an item name, etc., by using a numeral, text, a symbol, etc. Accordingly, the information of the sensor unit 10 is input.

Figure 4:
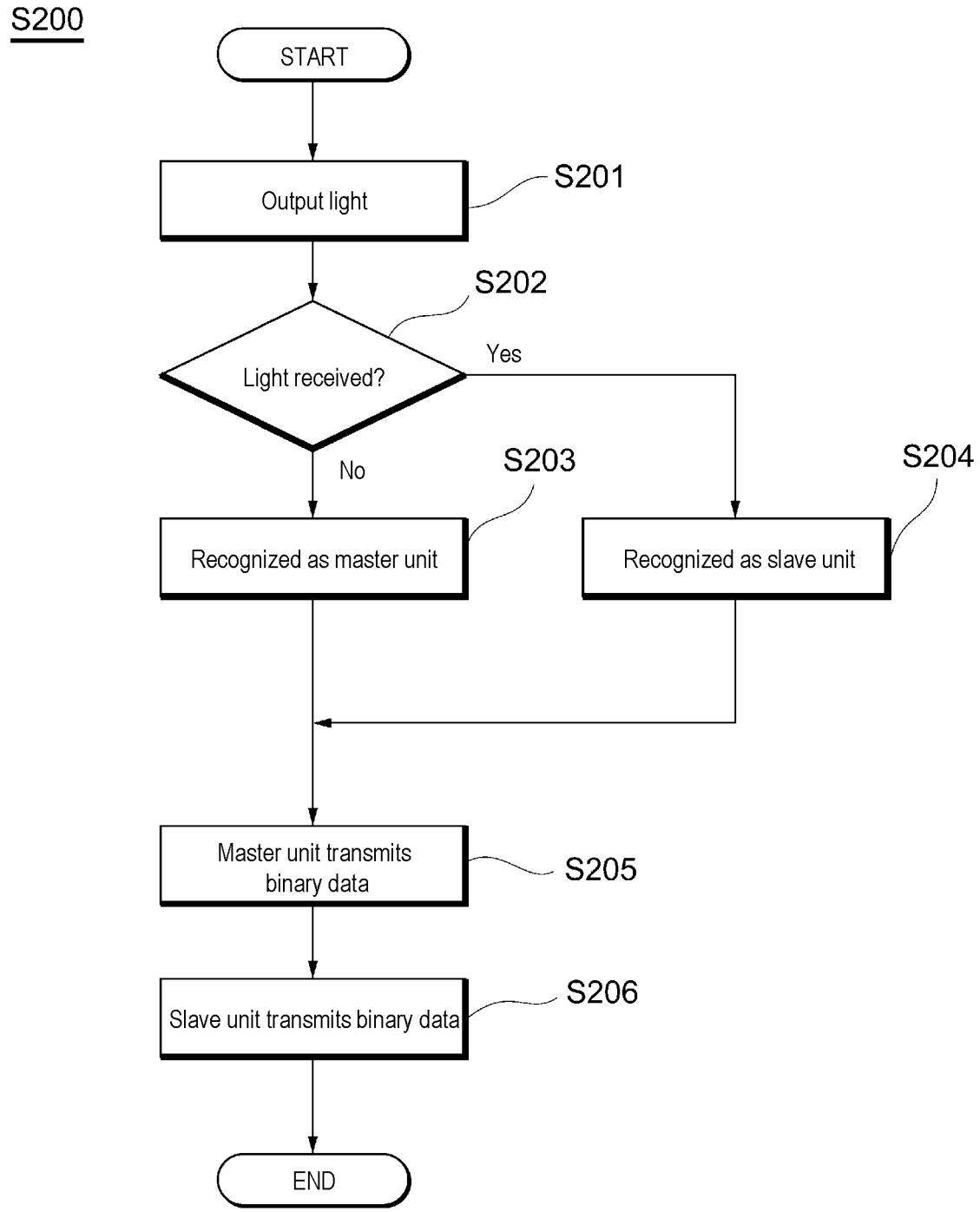
FIG. 4 is a flowchart exemplifying a schematic operation in which a sensor unit recognizes a channel number.

Then, referring to FIGS. 4 to 6, an operation in which a sensor unit recognizes a channel number according to an embodiment of the invention is described. FIG. 4 is a flowchart exemplifying a schematic operation in which the sensor unit 10 recognizes the channel number. FIG. 5 is a diagram exemplifying binary data which the sensor unit 10 as a master unit transmits. FIG. 6 is a diagram exemplifying binary data which the sensor unit 10 as a slave unit transmits.

As shown in FIG. 4, firstly, the control unit 60 sets both the input port and the output port of the light communication unit 50 to a general input/output allocation, and then sets the output as ON during a prescribed period to output light (S201). Accordingly, infrared light from the light emitting element 56 is emitted in the prescribed period, for example.

Then, the determining unit 63 determines whether infrared light is received by using the light receiving element 53, for example, after the prescribed period from light starting being output (S202).

In the case where the determination result of Step 202 is that no infrared light is received, it is considered that a sensor unit 10 is not present on the upstream side, such as the adjacent left side, in the unit series UL. Accordingly, the determining unit 63 recognizes itself as in a master unit in the unit series UL (S203). That is, the determining unit 63 recognizes the channel number as "1".

In the case where the determination result of Step 202 is that infrared light is received, it is considered that a sensor unit 10 is present on the upstream side, such as the adjacent left side, in the unit series UL. Accordingly, the determining unit 63 recognizes itself as in a slave unit in the unit series UL (S204). That is, the determining unit 63 recognizes the channel number as a number other than "1".

After a further prescribed period, the control unit 60 switches the input port and the output port of the light communication unit 50 to a universal asynchronous receiver transmitter (UART) allocation, and then, in the case of the master unit, transmits binary data exemplified in FIG. 5 to the adjacent sensor unit 10, such as the sensor unit 10 adjacent on the right (S205). In the case where the sensor unit 10 is a slave unit, the control unit 60 does not perform Step S205. The binary data takes into consideration a difference in the timing at which power is turned on, and is output repeatedly for a predetermined number of times or more.

As shown in FIG. 5, by inputting data "0x01" as "self CH number", the channel number of the master unit being a channel 1 is expressed. By inputting data "0x01" as "number of sensor type A", it is expressed that one sensor unit 10 of type A is recognized. That is, the type of the master unit sending the binary data of FIG. 5 is "A". For example, in the case where the type of the master unit is "B", data "0x00" is input as "number of sensor type A", whereas data "0x01" is input as "number of sensor type B". The type information expressing the type of the sensor unit 10 is held in each sensor unit 10.

The number of each type of the sensor unit 10 also expresses an order m (m being a positive integer) of each type of the sensor unit 10. By inputting data "0x01" as "number of sensor type A", it is expressed that the order m in a group of the sensor units 10 of the type A is "1".

"Setting the general input/output allocation" above means "not setting the UART allocation".

Referring to FIG. 4 again, in the sensor unit 10 receiving the binary data, i.e., in the sensor unit 10 as a slave unit, the control unit 60 transmits the binary data exemplified in FIG. 6 to the adjacent sensor unit 10, such as the sensor unit 10 adjacent on the right, by using the light communication unit 50 (S206). In the case where the sensor unit 10 is a master unit, the control unit 60 does not perform Step S206.

Since the data "0x01" has been input to "self CH number" of the received binary data, the control unit 60 of the sensor unit 10 receiving the binary data recognizes the channel number of itself as "2". That is, the channel number of itself is recognized as a number greater by 1 than the channel number expressed by the "self CH number" of the received binary data. In the binary data shown in FIG. 6, the channel number is incremented by 1 to express the channel number as "2", and data "0x02" is input as the "self CH number". Accordingly, in the case where data "0x05" has been input to the "self CH number" of the received binary data, data "0x06" is input to the "self CH number" in the binary data to be transmitted.

Also, in the example of FIG. 6, since the type of the sensor unit 10 which receives the binary data from the master unit is "A", "number of sensor type A" is incremented by 1 and data "0x02" is input. That is, it is recognized that the order is "2" in the group of the sensor units 10 of the type A.

Referring to FIG. 4 again, after Step S206, the control unit 60 ends a channel number recognition process S200.

In this way, binary data is sent one after another by the sensor unit 10. Each sensor unit 10 recognizes a number greater by 1 than the channel number expressed by the "self CH number" of the received binary data as the channel number.

Figure 7:
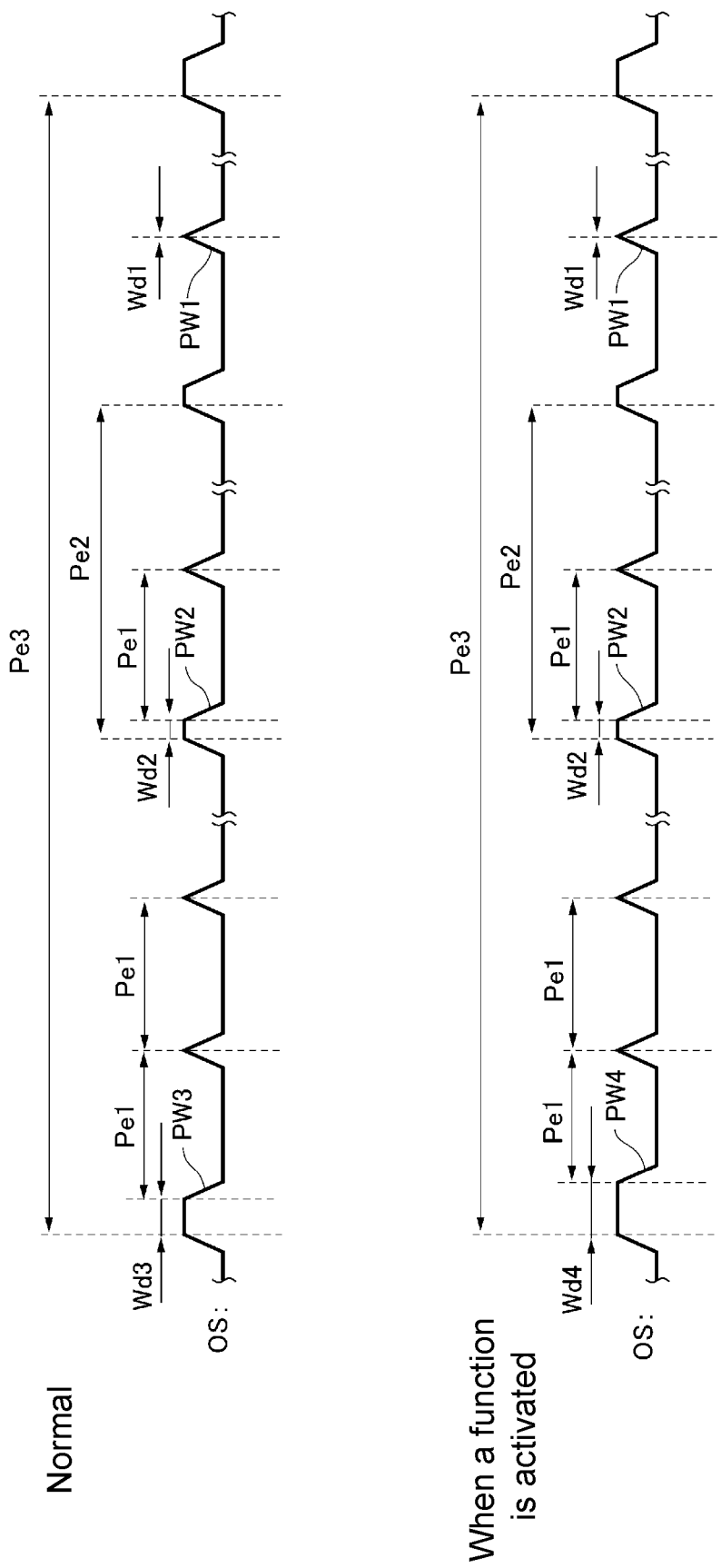
FIG. 7 is a waveform diagram exemplifying a light signal which a light communication unit shown in FIG. 3 transmits and receives.

Then, referring to FIGS. 7 and 8, an example of the light communication of a sensor unit according to an embodiment of the invention will be described. FIG. 7 is a waveform diagram exemplifying a light signal OS which the light communication unit 50 shown in FIG. 3 transmits and receives. FIG. 8 is a table exemplifying a relationship between a pulse wave included in the light signal OS of the light communication unit 50 shown in FIG. 3 and a use thereof.

As shown in the upper part of FIG. 7, in a normal situation where the prescribed function is not activated, the light signal OS, for example, includes three types of pulse waves, i.e., a first pulse wave PW1, a second pulse wave PW2, and a third pulse wave PW3. The first pulse wave PW1 has a pulse width Wd1 and is a wave with a period Pe1. The second pulse wave PW2 has a pulse width Wd2 greater than the pulse width Wd1 of the first pulse wave PW1 (pulse width Wd1<pulse width Wd2), and is a wave with a period Pe2 longer than the period Pe1 of the first pulse wave PW1 (period Pe1<period Pe2). The third pulse wave PW3 has a pulse width Wd3 greater than the pulse width Wd2 of the second pulse wave PW2 (pulse width Wd2<pulse width Wd3), and is a wave with a period Pe3 longer than the period Pe2 of the second pulse wave PW2 (period Pe2 <period Pe3).

As shown in the lower part of FIG. 7, in a situation where the prescribed function is activated, the light signal OS, for example, includes a fourth pulse wave PW4 in addition to the first pulse wave W1 and the second pulse wave PW2. The fourth pulse wave PW4 has a pulse width Wd4 greater than the pulse width Wd3 of the third pulse wave PW3 (pulse width Wd3<pulse width Wd4), and is a wave with the same period as the period Pe3 of the third pulse wave PW3.

According to the embodiment, in the lower part of FIG. 4, while an example in which the light signal OS includes the fourth pulse wave PW4 in place of the third pulse wave PW3 is shown, the invention is not limited thereto. At the time when the prescribed function is activated, the light signal OS may also include the third pulse wave PW3 and the fourth pulse wave PW4.

The control unit 60 uses a pulse wave in a different purpose in correspondence with the pulse width of the pulse wave included in the received light signal OS. As shown in FIG. 5, when receiving a pulse wave with the pulse width Wd1 or more, such as the first pulse wave PW1, the control unit 60 uses the pulse wave for the synchronization of the measurement timings by the light projection unit 30 and the light receiving unit 40. In addition, when receiving a pulse wave with the pulse width Wd2 or more, such as the second pulse wave PW2, the control unit 60 further uses the pulse wave as the timing of outputting measurement values by the light projection unit 30 and the light receiving unit 40 and as the timing for preventing the sensor units 10 of types "A" and "B" from interfering with each other. Moreover, when receiving a pulse wave with the pulse width Wd3 or more, such as the third pulse wave PW3, the control unit 60 further uses the pulse wave as the timing for preventing the sensor units 10 of types "C" and "D" from interfering with each other.

Furthermore, the activation unit 64 uses the pulse wave included in the light signal OS as the trigger signal activating the prescribed function. That is, at the time of the slave unit in the unit series UL, the activation unit 64 receives the light signal OS from the other side in the unit series UL, such as from the sensor unit 10 adjacent on the left, by using the light communication unit 50, and activates a prescribed process based on the pulse width of the pulse wave included in the light signal OS. Specifically, the activation unit 64 activates the sensitivity adjustment function which adjusts the sensitivity for detecting the target object when receiving a pulse wave with the pulse width Wd4, i.e., the fourth pulse wave PW4. In the sensitivity adjustment function, the control unit 60 changes the threshold used at the time of determining whether there is a target object. Accordingly, by activating the prescribed function based on the pulse width of the pulse wave included in the light signal OS, the trigger signal and signals other than the trigger signal in the light signal OS can be identified, and, in the light signal OS, the trigger signal and other signals, such as the synchronization signal, can be easily used together.

Moreover, at the time of the slave unit in the unit series UL, the activation unit 64 may receive the light signal OS from the other side in the unit series UL, such as from the sensor unit 10 adjacent on the left, by using the light communication unit 50, and activate a prescribed process based on the pulse width of the pulse wave included in the light signal OS and the number of pulse waves. Specifically, the activation unit 64 activates the sensitivity adjustment function when receiving the fourth pulse wave PW4 with the pulse width Wd4 thrice during a period that is three times the period Pe3 of the fourth pulse wave PW4. Accordingly, by activating the prescribed function based on the pulse width of the pulse wave included in the light signal OS and the number of pulse waves included in the light signal OS during a prescribed period, the trigger signal and signals other than the trigger signal in the light signal OS can be easily identified, and, in the light signal OS, the trigger signal and other signals, such as the synchronization signal, can be used together even more easily.

While FIG. 7 illustrates an example in which the activation unit 64 activates the sensitivity adjustment function when receiving the fourth pulse wave PW4 with the pulse width Wd4 thrice, the invention is not limited thereto. For example, the activation unit 64 may also activate the sensitivity adjustment function when receiving the fourth pulse wave PW4 with the pulse width Wd4 twice or four times. In such case, the activation unit 64 activates the sensitivity adjustment function when not receiving the fourth wave PW4 with the pulse width Wd4 during the period three times the period Pe3 of the fourth pulse PW3 after receiving the fourth pulse wave PW4 with the pulse width Wd4 twice or four times.

In addition, the prescribed function activated by the activation unit 64 is not limited to one function, but may also include multiple functions. In such case, for example, the activation unit 64 activates a first setting function which switches various settings to first setting values when receiving a fifth pulse wave PW5. The fifth pulse wave PW5 has a pulse width Wd5 greater than the pulse width Wd4 of the fourth pulse wave PW4 (pulse width Wd4<pulse width Wd5), and is a wave with the same period as the period Pe3 of the third pulse wave PW3. Alternatively, the activation unit 64 activates a first setting function which switches various settings to second setting values when receiving a sixth pulse wave PW6. The sixth pulse wave PW6 has a pulse width Wd6 greater than the pulse width Wd5 of the fifth pulse wave PW5 (pulse width Wd5<pulse width Wd6), and is a wave with the same period as the period Pe3 of the third pulse wave PW3. Accordingly, the prescribed function includes multiple functions, and by activating one of the multiple functions based on the pulse width of the pulse wave included in the light signal OS, the functions included in the prescribed function can be easily selected and activated.

Figure 9:
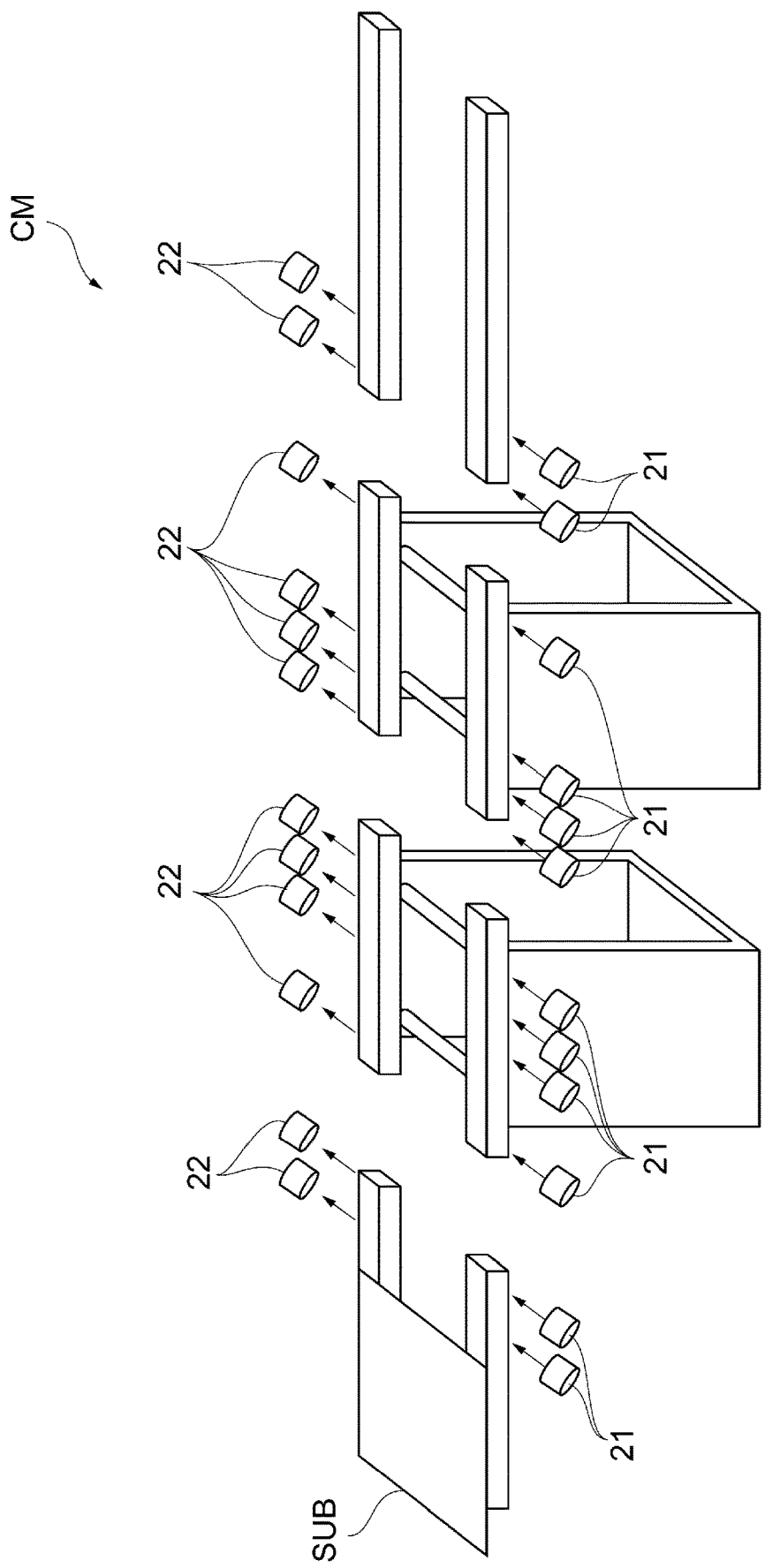
FIG. 9 is a perspective view exemplifying a schematic configuration of a conveyance mechanism in which a sensor head of a sensor unit is disposed.

Then, referring to FIG. 9, an application example of a case in which a sensor unit according to an embodiment of the invention activates a prescribed function is described. FIG. 9 is a perspective view exemplifying a schematic configuration of a conveyance mechanism CM in which sensor heads 21 and 22 of the sensor unit 10 are disposed.

As shown in FIG. 9, the conveyance mechanism CM is configured so as to move a substrate SUB in a direction from the left of FIG. 9 to the right, for example, by rotating a roller. In each of the sensor units 10 forming the unit series UL shown in FIG. 1, the sensor head 21 is disposed on a rail on the near side in FIG. 9, and the sensor head 23 is disposed on a rail on the back side in FIG. 9. With the light emitted from the sensor head 21 being shielded by the substrate SUB and not incident to the sensor head 22, the sensor unit 10 detects that the substrate SUB, which is the target object, is passing through.

The conveyance mechanism CM is configured to be able to convey multiple types of the substrates SUB. When the substrates SUB of different sizes are being transported, the conveyance mechanism CM moves the rail on the front side in the direction of the arrow sign shown in FIG. 9, and the distance between the rail on the front side and the rail on the back side is able to vary.

When the distance between the rails is changed, since the distance between the sensor head 21 and the sensor head 22 is also changed, it becomes necessary to adjust each of the sensor units 10 to the sensitivity corresponding to the distance between the rails of the conveyance mechanism CM.

In such case, the sensor unit 10 according to the embodiment activates the prescribed function, such as the sensitivity adjustment function, based on a signal from the outside, and outputs a trigger signal for activating the prescribed function to the outside based on the signal from the outside. Accordingly, the trigger signal can be transmitted to the adjacent sensor unit 10 in the unit series UL, such as the sensor unit 10 adjacent on the right. Accordingly, with the respective sensor units 10 successively transmitting the trigger signal, the prescribed function, such as the sensitivity adjustment function, with respect to the sensor units 10 can be collectively activated, and the work load for activating the prescribed function, such as the sensitivity adjustment function, in each sensor unit 10 can be reduced.

Figure 10:
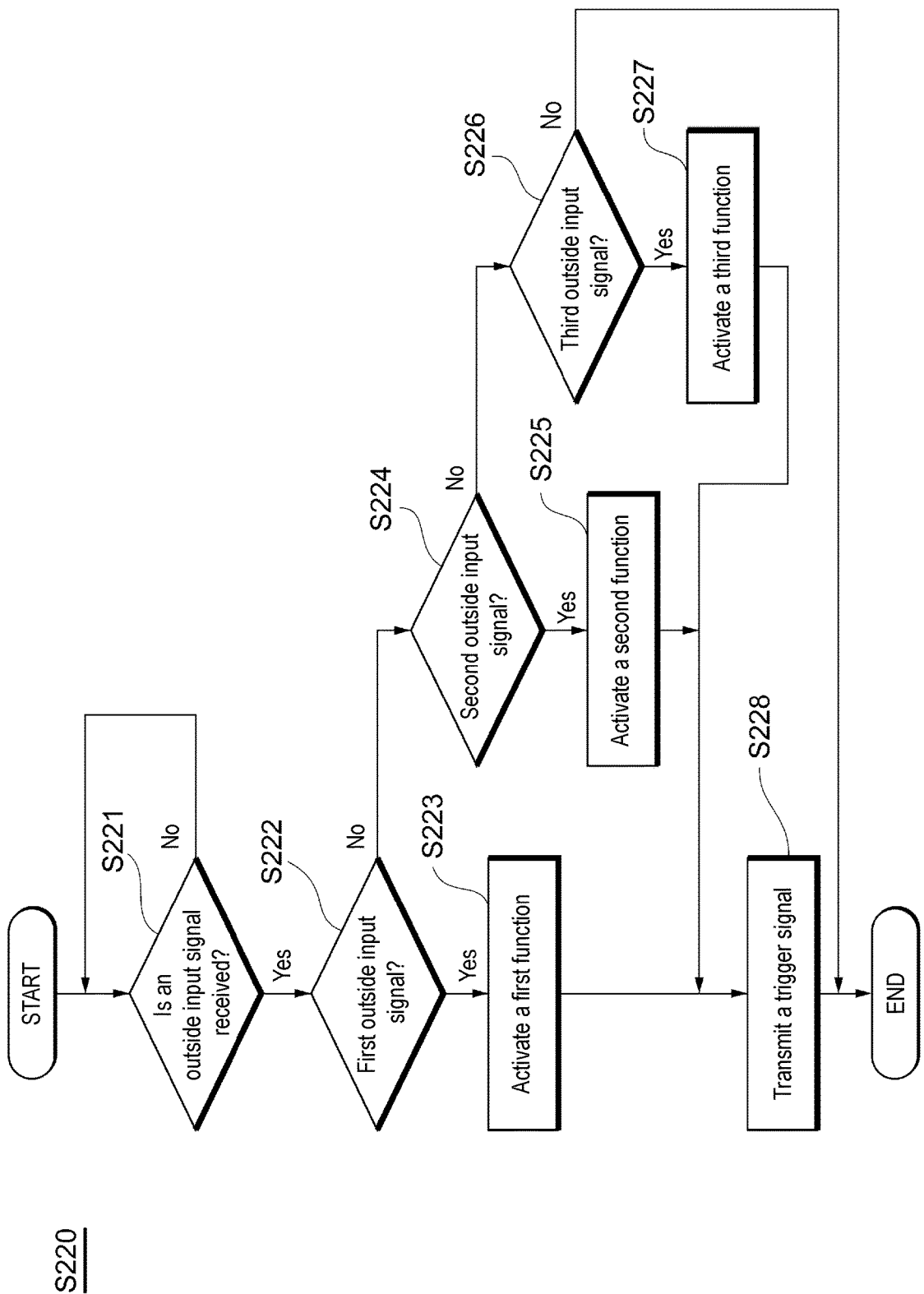
FIG. 10 is a flowchart exemplifying a schematic operation in which a sensor unit, as a master unit, activates a prescribed function.
Figure 11:
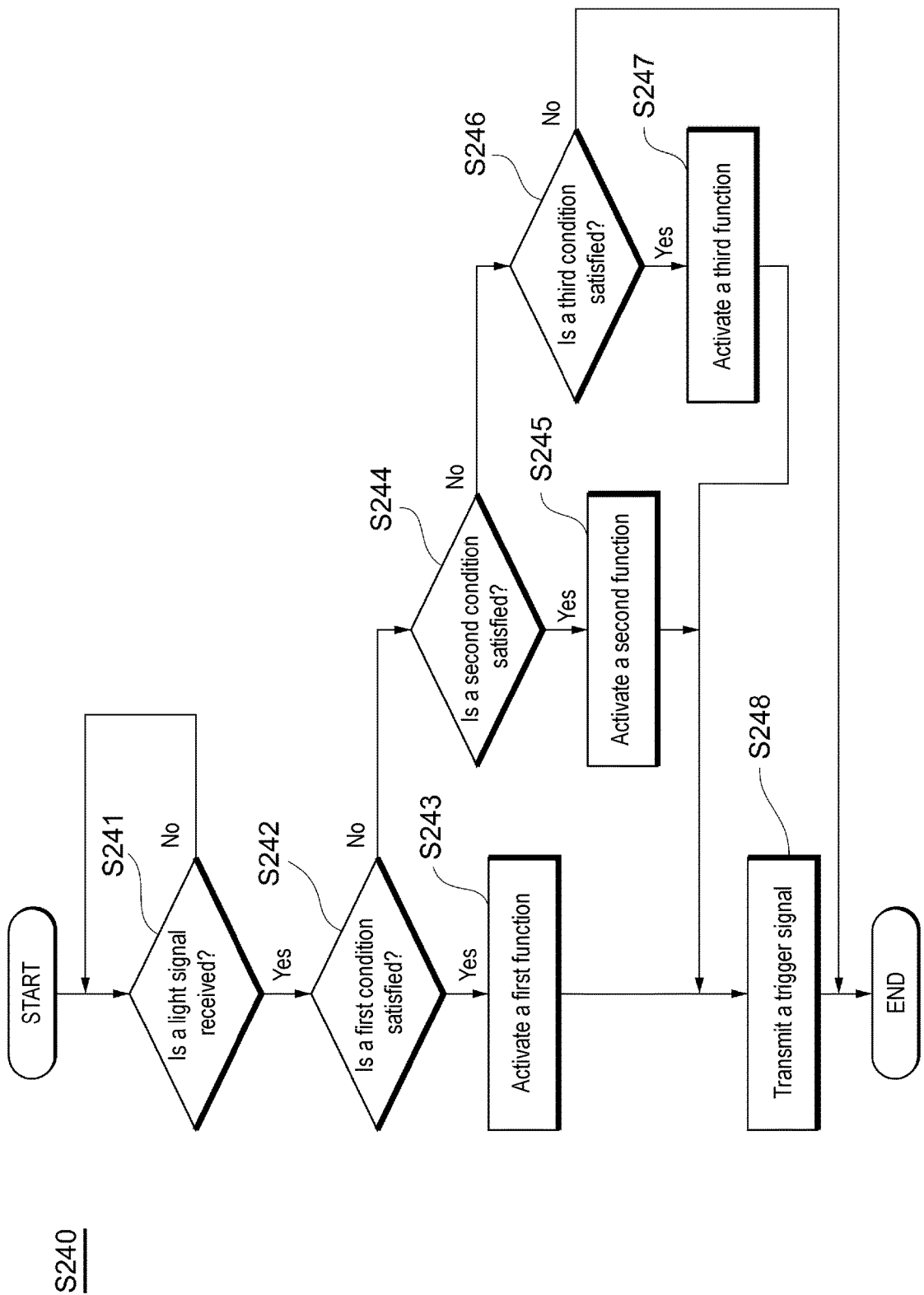
FIG. 11 is a flowchart exemplifying a schematic operation in which a sensor unit, as a slave unit, activates a prescribed function.

Then, referring to FIGS. 10 and 11, an operation performed when a sensor unit according to an embodiment of the invention activates a prescribed function is described. FIG. 10 is a flowchart exemplifying a schematic operation in which the sensor unit 10, which is a master unit, activates a prescribed function. FIG. 11 is a flowchart exemplifying a schematic operation in which the sensor unit 10, which is a slave unit, activates a prescribed function.

When the sensor unit 10 itself is determined as the master unit in the unit series UL by the determining unit 63, for example, the control unit 60 executes a master unit function activation process S220 shown in FIG. 10.

Firstly, the activation unit 64 determines whether an outside input signal is received (S221) based on a signal from the outside input unit 72. Step S221 is repeated until an outside signal is received.

In the case where an outside input signal is received based on the determination result of Step S221, the activation unit 64 determines whether the outside input signal is a first outside input signal (S222). Whether the outside input signal is the first outside input signal is determined by using, for example, the period of the outside input signal, the amplitude (size) of the outside input signal, the pulse width thereof in the case where the outside input signal is a pulse wave, or a combination thereof as a criterion.

In the case where the determination result of Step S222 indicates that the received outside input signal is the first outside input signal, the activation unit 64 activates a first function in correspondence with the first outside input signal (S223).

Meanwhile, in the case where the determination result of Step S222 indicates that the received outside input signal is not the first outside input signal, the activation unit 64 determines whether the outside input signal is a second outside input signal (S224). Whether the outside input signal is the second outside input signal is determined by using, for example, the period of the outside input signal, the amplitude (size) of the outside input signal, the pulse width thereof in the case where the outside input signal is a pulse wave, or a combination thereof as a criterion. Such criterion may be different from the criterion on whether the outside input signal is the first outside input signal.

In the case where the determination result of Step S224 indicates that the received outside input signal is the second outside input signal, the activation unit 64 activates a second function in correspondence with the second outside input signal (S225).

Meanwhile, in the case where the determination result of Step S224 indicates that the received outside input signal is not the second outside input signal, the activation unit 64 determines whether the outside input signal is a third outside input signal (S226). Whether the outside input signal is the third outside input signal is determined by using, for example, the period of the outside input signal, the amplitude (size) of the outside input signal, the pulse width thereof in the case where the outside input signal is a pulse wave, or a combination thereof as a criterion. Such criterion may be different from the criteria on whether the outside input signal is the first outside input signal and whether the outside input signal is the second outside input signal.

In the case where the determination result of Step S226 indicates that the received outside input signal is the third outside input signal, the activation unit 64 activates a third function in correspondence with the third outside input signal (S227).

Meanwhile, in the case where the determination result of Step S226 indicates that the received outside input signal is not the third outside input signal, the received outside input signal is considered as neither of the first outside input signal, the second outside input signal, and the third outside input signal for activating the prescribed functions. Accordingly, the control unit 60 ends the master unit function activation process S220 without taking any action.

After Step S223, Step S225, and Step S227, the signal output unit 65 transmits a light signal including the trigger signal to one of the sensor units 10 in the unit series, such as the sensor unit 10 on the right side, by using the light communication unit 50 (S228). The transmitted trigger signal is a pulse wave with the pulse width Wd4 in the case after Step S223, a pulse wave with the pulse width Wd5 in the case after Step S225, and is a pulse wave with the pulse width Wd6 in the case after Step S227.

After Step S228, the control unit 60 ends the master unit function activation process S220.

In addition, when the sensor unit 10 itself is determined as the slave unit in the unit series UL by the determining unit 63, for example, the control unit 60 executes a slave unit function activation process S240 shown in FIG. 11.

Firstly, the activation unit 64 determines whether the light signal OS is received (S241) by using the light communication unit 50. Step S241 is repeated until the light signal OS is received.

In the case where the light signal OS is received based on the determination result of Step S241, the activation unit 64 determines whether the light signal OS satisfies a first condition (S242). The first condition is, for example, that the light signal OS includes the pulse wave PW4 with the pulse width Wd4.

In the case where the determination result of Step S242 indicates that the received light signal OS satisfies the first condition, the activation unit 64 activates a first function in correspondence with the first condition (S243).

Meanwhile, in the case where the determination result of Step S242 indicates that the received light signal OS does not satisfy the first condition, the activation unit 64 determines whether the light signal OS satisfies a second condition (S244). The second condition is, for example, that the light signal OS includes the pulse wave PW5 with the pulse width Wd5.

In the case where the determination result of Step S244 indicates that the received light signal OS satisfies the second condition, the activation unit 64 activates a second function in correspondence with the second condition (S245).

Meanwhile, in the case where the determination result of Step S244 indicates that the received light signal OS does not satisfy the second condition, the activation unit 64 determines whether the light signal OS satisfies a third condition (S246). The third condition is, for example, that the light signal OS includes the pulse wave PW6 with the pulse width Wd6.

In the case where the determination result of Step S246 indicates that the received light signal OS satisfies the third condition, the activation unit 64 activates a third function in correspondence with the third condition (S247).

Meanwhile, in the case where the determination result of Step S246 indicates that the received light signal OS does not satisfy the third condition, the received light signal OS is considered as not including the trigger signal for activating a prescribed function. Accordingly, the control unit 60 ends the slave unit function activation process S240 without taking any action.

After Step S243, Step S245, and Step S247, the signal output unit 65 transmits the light signal OS including the trigger signal to one of the sensor units 10 in the unit series UL, such as the sensor unit 10 adjacent on the right, by using the light communication unit 50 (S248). The transmitted trigger signal is, for example, the fourth pulse wave PW4 with the pulse width Wd4 in the case after Step S243, the fifth pulse wave PW5 with the pulse width Wd5 in the case after Step S245, and the sixth pulse wave PW6 with the pulse width PW6 in the case after Step S247.

After Step S228, the control unit 60 ends the slave unit function activation process S240.

An exemplary embodiment of the invention has been described above. The sensor unit 10 and the function activation method according to an embodiment of the invention activate the prescribed function, such as the sensitivity adjustment function, based on a signal from the outside, and outputs the trigger signal for activating the prescribed function to the outside based on the signal from the outside. Accordingly, the trigger signal can be transmitted to the adjacent sensor unit 10 in the unit series UL, such as the sensor unit 10 adjacent on the right. Accordingly, with the respective sensor units 10 successively transmitting the trigger signal, the prescribed function, such as the sensitivity adjustment function, with respect to the sensor units 10 can be collectively activated, and the work load for activating the prescribed function, such as the sensitivity adjustment function, in each sensor unit 10 can be reduced.

The embodiments described above are for facilitating the understanding of the invention, and are not for limiting and interpreting the invention. Each element included in the embodiment and its arrangement, material, condition, shape, size, and the like are not limited to those exemplified, and can be changed as appropriate. In addition, the configurations shown in different embodiments can be partially replaced or combined.

APPENDIX

1. A sensor unit (10), capable of forming a unit series by connecting a plurality of sensor units. The sensor unit includes: an activation unit (64), activating a prescribed function based on a signal from outside; and a signal output unit (65), outputting a trigger signal for activating the prescribed function to the outside based on the signal from the outside.

10. A function activation method for a sensor unit (10) capable of forming a unit series by connecting a plurality of sensor units. The function activation method includes: an activation step of activating a prescribed function based on a signal from outside; and a signal output step of outputting a trigger signal for activating the prescribed function to the outside based on the signal from the outside.

What is claimed is:

1. A sensor unit, capable of forming a unit series by connecting a plurality of sensor units, the sensor unit comprising:
    an activation unit, activating a prescribed function based on a signal from outside;
    a signal output unit, outputting a trigger signal for activating the prescribed function to the outside based on the signal from the outside; and
    a light communication unit capable of light signal transmission and reception,
    wherein the signal output unit transmits a light signal comprising the trigger signal to one of the sensor units in the unit series by using the light communication unit.

2. The sensor unit as claimed in claim 1, wherein at a time of a slave unit in the unit series, the activation unit activates the prescribed function based on the trigger signal comprised in the light signal received from another sensor unit in the unit series by using the light communication unit.

3. The sensor unit as claimed in claim 1, wherein the trigger signal is represented by a pulse wave, and
at a time of a slave unit in the unit series, the activation unit activates the prescribed function based on a width of the pulse wave comprised in the light signal received from another sensor unit in the unit series by using the light communication unit.

4. The sensor unit as claimed in claim 1, wherein the trigger signal is represented by a pulse wave, and
at a time of a slave unit in the unit series, the activation unit activates the prescribed function based on a width of the pulse wave comprised in the light signal received from another sensor unit in the unit series by using the light communication unit and a number of the pulse wave comprised in the light signal during a prescribed period.

5. The sensor unit as claimed in claim 1, wherein the trigger signal is represented by a pulse wave,
the prescribed function comprises a plurality of functions, and
at a time of a slave unit in the unit series, the activation unit activates one of the functions based on a width of the pulse wave comprised in the light signal received from another sensor unit in the unit series by using the light communication unit.

6. The sensor unit as claimed in claim 1, further comprising an outside input unit receiving an outside input signal,
wherein at a time of a master unit in the unit series, the activation unit activates the prescribed function based on the outside input signal.

7. The sensor unit as claimed in claim 1, further comprising: a light projection unit, emitting light toward a target object; and
a light receiving unit, configured to receive light to be able to detect a light receiving amount.

8. A sensor system, comprising a plurality of sensor units as claimed in claim 1.

9. A function activation method for a sensor unit capable of forming a unit series by connecting a plurality of sensor units, the function activation method comprising:
an activation step of activating a prescribed function based on a signal from outside; and
a signal output step of outputting a trigger signal for activating the prescribed function to the outside based on the signal from the outside,
wherein the signal output step comprises transmitting a light signal comprising the trigger signal to one of the sensor units in the unit series.

10. The function activation method as claimed in claim 9, wherein the activation step comprises at a time of a slave unit in the unit series, activating the prescribed function based on the trigger signal comprised in the light signal received from another sensor unit in the unit series.

11. The function activation method in claim 9, wherein the trigger signal is represented by a pulse wave, and
the activation step comprises: at a time of a slave unit in the unit series, activating the prescribed function based on a width of the pulse wave comprised in the light signal received from another sensor unit in the unit series.

12. The function activation method in claim 9, wherein the trigger signal is represented by a pulse wave, and
wherein the activation step comprises: at a time of a slave unit in the unit series, activating the prescribed function based on a width of the pulse wave comprised in the light signal received from another sensor unit in the unit series and a number of the pulse wave comprised in the light signal during a prescribed period.

13. The function activation method in claim 9, wherein the trigger signal is represented by a pulse wave,
the prescribed function comprises a plurality of functions, and
the activation step comprises: at a time of a slave unit in the unit series, activating one of the functions based on a width of the pulse wave comprised in the light signal received from another sensor unit in the unit series.

14. The function activation method in claim 9, wherein the activation step comprises: at a time of a master unit in the unit series, activating the prescribed function based on an outside input signal.

* * * * *